(No Model.)

A. B. BARKER.
HARVESTER TRUCK.

No. 305,415. Patented Sept. 23, 1884.

Witnesses.
Thos. H. Hutchins.
Wm. J. Hutchins.

Inventor.
Asahel B. Barker.

UNITED STATES PATENT OFFICE.

ASAHEL B. BARKER, OF FRANKFORT, ILLINOIS.

HARVESTER-TRUCK.

SPECIFICATION forming part of Letters Patent No. 305,415, dated September 23, 1884.

Application filed April 19, 1884. (No model.)

*To all whom it may concern:*

Figure 1:
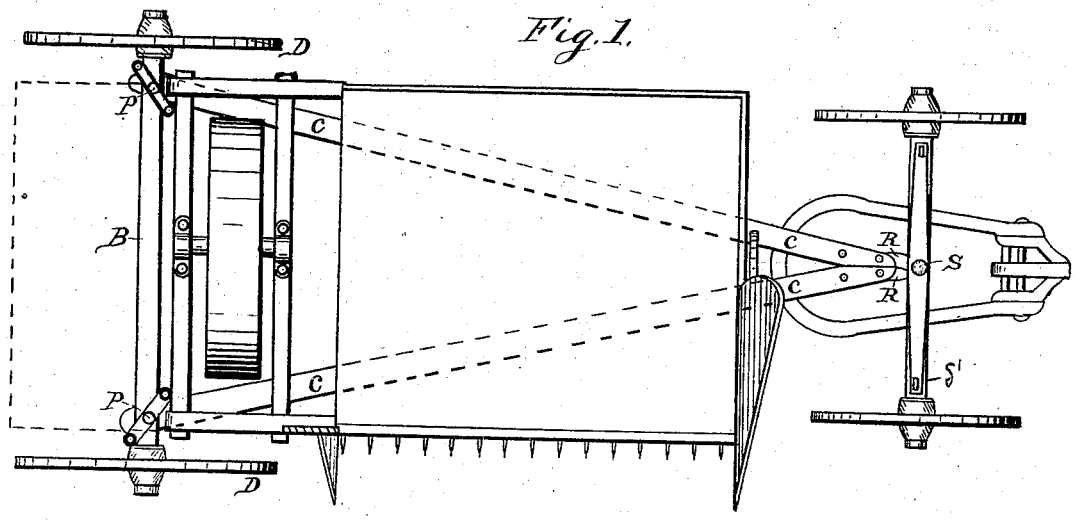
Figure 2:
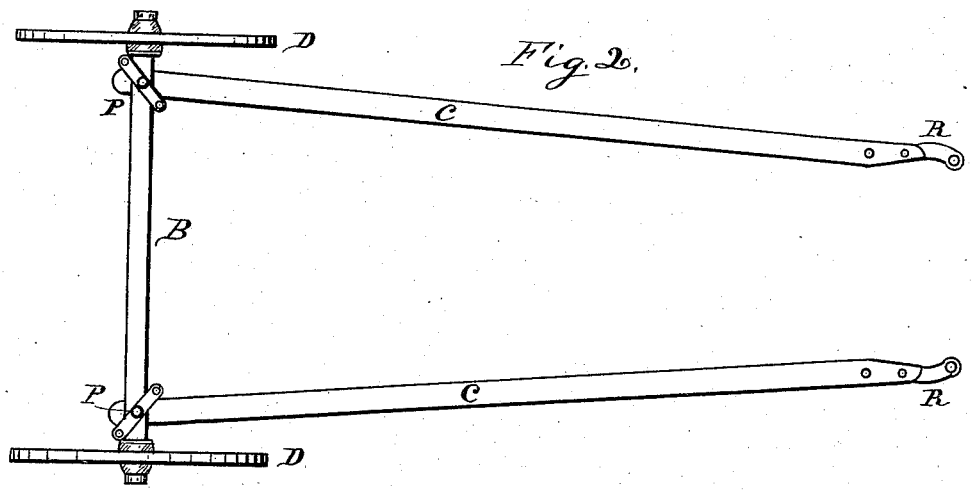
Figure 3:
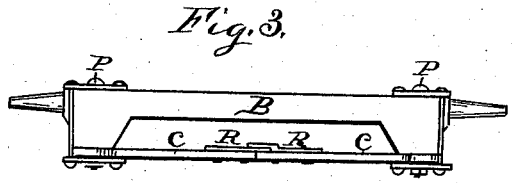

Be it known that I, ASAHEL B. BARKER, a citizen of the United States of America, residing at Frankfort, in the county of Will and State of Illinois, have invented certain new and useful Improvements in Harvester-Trucks, of which the following is a specification, reference being had therein to the accompanying drawings.
Figure 1 is a plan view on the top, showing the manner of its application to the harvester and the manner in which the harvester is to be loaded on it; Fig. 2, a plan view on the top, showing the truck detached from the harvester; and Fig. 3, a rear view of the truck detached from the harvester.

This invention relates to certain improvements in harvester-trucks for use in the transportation of a harvester endwise from one place to another, which improvements are fully set forth in the following specification and claim.

Referring to the drawings, B represents the axle of the truck, which is supported on the wheels D D, and to which are pivotally connected the two reaches *c c* at P P, as shown. The reaches hang a little below the axle, to render them easily shoved under the harvester, so as to render it unnecessary to elevate the harvester higher than the appliances on it will raise it and support the harvester when it is let down on them, forming a spring-seat for the harvester, to save it from jolts and jars. The reaches *c c* are designed to be opened and closed from each other, for the purpose hereinafter stated. The front ends of the reaches are provided with the plates R R, firmly attached thereto, and provided with eyes, so that when the ends of the two reaches are brought in contact the said plates will overlap each other, so a bolt may pass through the two eyes, and thus hold the two reaches together. It is designed that the hind wheels of an ordinary wagon can be placed on the axle B, and the forward axle and wheels of a wagon support the front ends of the reaches *c c* by means of the king-bolt S being passed through the two eyes of the plates R R, as shown in Fig. 1. The dotted lines in Fig. 1 show the position of a harvester when loaded on the truck.

The operation or mode of using the said truck is substantially as follows: Heretofore in trucks of this character the outer ends of the two reaches *c c* have been rigidly fixed together, so they could not be opened apart, as in this machine. For that reason, in order to place it under a harvester, the platform end of the harvester had to be raised by hand, so the machine could stand on the bull-wheel end. The truck was then backed up under the machine until the axle came up in contact with the bull-wheel in front of it. The machine was then let down on the truck and the ends of the reaches attached to the front axle in about the same manner as in this case. By such loading, and by having the reaches rigidly fixed together, the bull-wheel and the greater part of the weight of the machine would fall outside of the axle B, so that, without care, the machine would fall over the axle by its overbalancing to that side, as it was impossible to load the machine on a truck where the two reaches are rigidly united so as to have the bull-wheel and the weight of the harvester between the axle B and the outer ends of the reaches *c c*.

In this truck the manner of loading is as follows: The harvester is first elevated by means of the appliances that are a part of it until it is raised as high as it can be thus elevated. The two reaches are then spread apart in the manner shown in Fig. 2, and passed under the harvester from the bull-wheel end, as shown in Fig. 1, until the axle B comes up in contact with the bull-wheel. The two reaches are then brought together, so the outer ends come in contact, and the plates R R overlap each other, and the king-bolt S of the front axle of the wagon passed through the eyes of said plates, as shown in Fig. 1. The harvester is then let down to rest on the reaches *c c* in the position shown by the dotted lines in Fig. 1, with the bull-wheel and the main weight of the machine in front of the axle B. The appliances on the harvester for elevating and lowering it will elevate the bull-wheel off the ground so the harvester will rest entirely on the truck.

It is unnecessary to stand the harvester up on one end to load it on this truck.

I am aware of the use of trucks for this purpose constructed substantially like this, with the exception of having the two reaches pivoted to the axle and adapted to be spread apart at their front ends, to permit the harvester to be loaded, as stated, so that the only new feature in this truck consists in having the reaches pivoted to the axle and capable of being opened and closed from each other for the purpose stated. The reaches, being rather long, form a spring-surface for supporting the harvester to relieve it from jolts and injury, as in case of its resting rigidly on the axles. The new result accomplished by this construction is that the harvester may be loaded so the bull-wheel and the heaviest part of the machine will rest on the reaches $c\ c$ between the axles B and S', for the reasons stated, in consequence of the reaches being made so they can be spread apart at their outer ends, as shown in Fig. 2; also, no caster-wheels at all are used. The four wheels of an ordinary wagon are used, and dispense with any special wheels for the truck. The front axle of an ordinary wagon is used to support the outer ends of the reaches in the place of a caster-wheel, thus having two ordinary wagon-wheels support that end of the reaches instead of one little caster-wheel, that in many instances is utterly worthless for the purpose, so that the harvester is transported on four ordinary wagon-wheels, making it very easy to be hauled from one place to another.

Having thus described my invention, what I claim as new, and desire to secure by Letters Patent, is as follows, to wit:

In a harvester-truck, the combination of the axles B and S', spreading reaches $c\ c$, pivotally secured at their rear ends to axle B, and each provided with an eye-plate at the front end, arranged to overlap each other, to receive the king-bolt S of axle S', all adapted to operate as and for the purpose set forth.

ASAHEL B. BARKER.

Witnesses:
WM. J. HUTCHINS,
THOS. H. HUTCHINS.